(12) United States Patent
Jung et al.

(10) Patent No.: US 8,104,351 B2
(45) Date of Patent: Jan. 31, 2012

(54) ULTRASOUND SENSOR WITH MEMBRANE

(75) Inventors: Thomas Jung, Heilbronn (DE);
Hans-Wilhelm Wehling, Heilbronn (DE); Uwe Kupfernagel, Vaihingen (DE); Dietmar Gruedl, Asperg (DE); Heinrich Gotzig, Heibronn (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 512 days.

(21) Appl. No.: 12/303,924

(22) PCT Filed: May 24, 2007

(86) PCT No.: PCT/EP2007/004619
§ 371 (c)(1),
(2), (4) Date: Dec. 8, 2008

(87) PCT Pub. No.: WO2007/144063
PCT Pub. Date: Dec. 21, 2007

(65) Prior Publication Data
US 2010/0229649 A1    Sep. 16, 2010

(30) Foreign Application Priority Data
Jun. 14, 2006  (DE) .......................... 10 2006 028 211

(51) Int. Cl.
*G01H 17/00* (2006.01)
(52) U.S. Cl. ............................................ 73/649; 73/632
(58) Field of Classification Search ..................... 73/649, 73/632; 310/334, 336; 381/114, 426, 432
See application file for complete search history.

(56) References Cited

U.S. PATENT DOCUMENTS

| | | | |
|---|---|---|---|
| 4,433,321 A * | 2/1984 | Widdowson | 338/42 |
| 4,556,814 A * | 12/1985 | Ito et al. | 310/334 |
| 6,792,810 B2 * | 9/2004 | Kupfernagel et al. | 73/632 |
| 6,902,215 B1 * | 6/2005 | Condeelis | 293/117 |
| 7,321,115 B2 * | 1/2008 | Langlois et al. | 250/239 |
| 7,554,248 B2 * | 6/2009 | Oda et al. | 310/348 |

FOREIGN PATENT DOCUMENTS

| | | |
|---|---|---|
| DE | 43 29 055 A1 | 3/1995 |
| DE | 199 27 797 C1 | 12/2000 |
| EP | 1 260 965 A2 | 11/2002 |
| JP | 407267023 A * | 10/1995 |
| WO | 99/30313 A | 6/1999 |

OTHER PUBLICATIONS

International Search Report w/translation from PCT/EP2007/004619 dated Feb. 12, 2008 (6 pages).

* cited by examiner

*Primary Examiner* — J M Saint Surin
(74) *Attorney, Agent, or Firm* — Osha • Liang LLP

(57) ABSTRACT

The invention relates to an ultrasonic sensor (2) in particular a motor vehicle ultrasonic sensor, comprising a housing (4), and a diaphragm (6) which is supported in or on a section (12) of the housing (4) and which has a diaphragm base (8) and a substantially cylindrical wall section (18) adjoining the diaphragm base (8), at least one stabilizing and/or attenuating auxiliary element (22, 30, 32) being arranged on or in the wall section (18) of the diaphragm (6).

17 Claims, 1 Drawing Sheet

ULTRASOUND SENSOR WITH MEMBRANE

Figure 1:
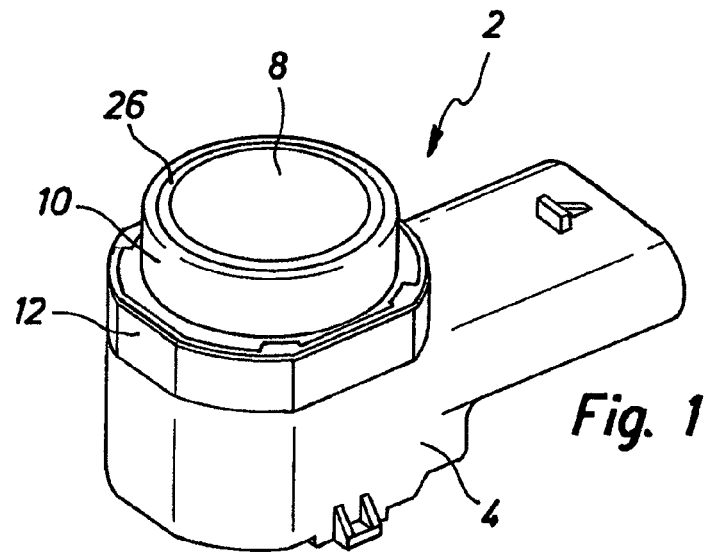

The invention relates to an ultrasonic sensor, in particular a motor vehicle ultrasonic sensor, comprising a housing, and a diaphragm, which is supported in or on a section of the housing and which has a diaphragm base and a substantially cylindrical wall section adjoining the diaphragm base.

The diaphragm of such an ultrasonic sensor usually comprises a diaphragm base, which by means of a piezo element can be set in oscillation so that ultrasonic signals can be emitted into the surroundings of the ultrasonic sensor. Ultrasonic signals reflected by obstacles can be received and processed by the ultrasonic sensor.

In order to achieve a defined oscillation of the diaphragm or the diaphragm base, the diaphragm is usually not connected directly to the housing of the ultrasonic sensor, but may be enclosed by isolating material, which radially outwards defines an annular housing section of the ultrasonic sensor housing.

Such an isolating element serves largely to isolate the diaphragm from the housing of the ultrasonic sensor in respect of any oscillations. There is nevertheless a need to improve the oscillation behaviour of the aforementioned ultrasonic sensor.

Proceeding from this, the object of the present invention is to provide an ultrasonic sensor having an optimum oscillation behaviour.

According to the invention this object is achieved in that at least one stabilizing and/or attenuating auxiliary element is arranged at or in the wall section of the diaphragm.

The auxiliary element makes it possible to influence the oscillation behaviour of the diaphragm. This enables not only the oscillation behaviour of the diaphragm base to be optimized, but also the oscillation behaviour of the wall section of the diaphragm. It is therefore possible to design the diaphragm base so that it is particularly easy to set in oscillation, so that ultrasonic signals can be generated. The wall section on the other hand can be influenced by means of the stabilizing and/or attenuating auxiliary element, so that it can be made to oscillate only very slightly, if at all. In this way it is possible to prevent any scope for the transmission of oscillations from the wall section of the diaphragm, possibly via the aforementioned isolating material, into the housing and thence back in the opposite direction to the diaphragm. Such unwanted transmission of oscillations can mean that correspondingly strong oscillations of the housing will cause feedback into the diaphragm, and that this feedback will lead to incorrect measurements, that is to say the registering of phantom obstacles.

The auxiliary element and the diaphragm base may be made from the same materials, but owing to their material structure will have different mechanical characteristics. For example, one of the components may have an expanded metal structure, whilst the other component has an ordinary metal structure.

According to one embodiment of the invention the auxiliary element and the diaphragm base are formed from different materials, for example from different alloys, in particular aluminium alloys.

According to the invention the diaphragm base is furthermore formed from a material which has a different, in particular a lower, resistance to deformation than the material of which the auxiliary element is formed. In this way the wall section can be stiffened, which minimizes the introduction of oscillations in the wall section.

According to the invention the diaphragm base is furthermore formed from a material which has a different, in particular a higher, density than the material of which the auxiliary element is formed. In this way it is possible to increase the inertia of the wall section of the diaphragm, so that the wall section cannot be set in oscillation as readily.

If the diaphragm base is formed at least partially from aluminium, it is particularly easy to set this in oscillation by means of the piezo element, since aluminium is lightweight and has a comparatively low resistance to deformation.

The auxiliary element may be formed at least partially from steel. This material has a comparatively high density and a comparatively high resistance to deformation. However, ceramic materials and/or plastics may also be used for the auxiliary element.

According to one advantageous embodiment of the invention, the auxiliary element is of annular design shape. This allows the wall section of the diaphragm to be uniformly reinforced in a plane substantially perpendicular to the emitting direction of the ultrasonic sensor, so that the oscillation behaviour is uniformly influenced.

The auxiliary element may be of circular or rectangular cross section. With an auxiliary element of circular cross section a high stiffening effect can be obtained using a comparatively small amount of material. An auxiliary element of rectangular cross section is especially easy to join to the wall section of the diaphragm, as will be described in more detail below.

In a preferred embodiment of the invention the auxiliary element is formed by a retainer ring. A retainer ring is available as a mass-produced part and is therefore particularly cost effective. The retainer ring may be supported in a groove formed on the wall section. The retainer ring may be arranged radially outside or radially inside the wall section. More than one retainer ring can obviously be provided, one retainer ring being arranged radially outside and one retainer ring radially inside, for example. The same applies to auxiliary elements that are not embodied as retainer rings.

The auxiliary element and the wall section can be pressed together, for example by shrinking one of said components onto the other. For example, an annular auxiliary element arranged radially outside may be heated before being pushed onto a wall section. When the auxiliary element has cooled, it will be shrunk onto the wall section.

The auxiliary element may extend in an axial direction of the wall section from an end of the diaphragm remote from the diaphragm base towards the diaphragm base. In this way the diaphragm can be stiffened in an area in which the introduction of oscillations is particularly undesirable, since this area is spatially adjacent to the section of the housing of the ultrasonic sensor, in which the diaphragm is supported.

The auxiliary element may also extend in an axial direction of the wall section from the diaphragm base towards the end of the diaphragm remote from the diaphragm base. This allows the diaphragm to also be stiffened in an area immediately adjacent to the diaphragm base. If the auxiliary element in this case extends right to the end of the diaphragm, the entire wall section can be stiffened or reinforced.

This is also possible where the auxiliary element itself forms the wall section. Such a diaphragm therefore comprises an auxiliary element which forms the substantially cylindrical wall section adjoining the diaphragm base.

Further advantages, features and details of the invention are set forth in the following description, in which especially preferred exemplary embodiments are described in detail with reference to the drawing. Here the features shown in the drawing and mentioned in the claims and the description may each be essential for the invention either individually or in any combination.

Figure 2:
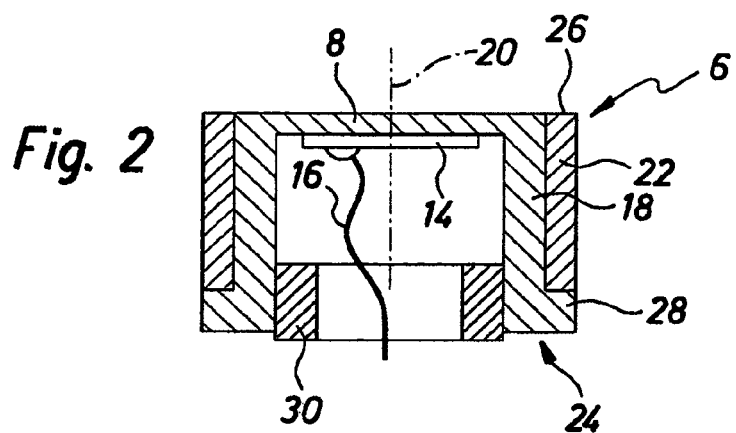
Figure 3:
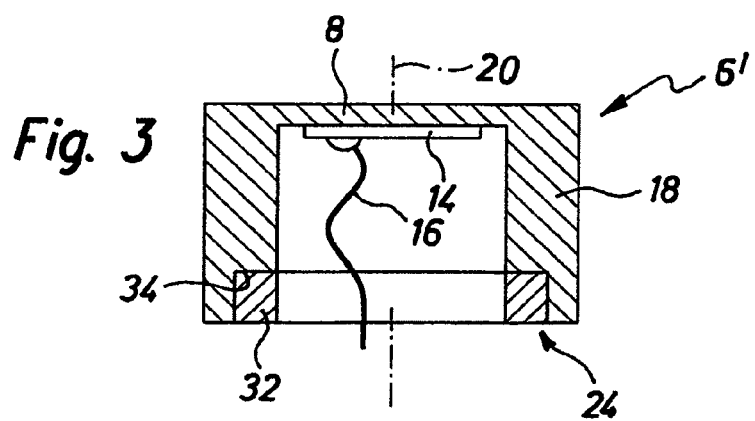

In the drawing:

FIG. 1. shows a perspective view of an ultrasonic sensor according to the invention;

FIG. 2. shows a detail of a sectional side view of the ultrasonic sensor in FIG. 1 according to a first embodiment; and FIG. 3. shows a detail of a sectional side view of the ultrasonic sensor in FIG. 1 according to a second embodiment.

In FIG. 1 an ultrasonic sensor is generally denoted by the reference numeral 2. This has an approximately canister-shaped housing 4. Supported on the housing 4 is a diaphragm 6 of substantially cylindrical design shape, which comprises a disk-shaped diaphragm base 8 (cf. also FIGS. 2 and 3). The diaphragm 6 is enclosed radially outside by an annular isolating element 10, which isolates the diaphragm 6 from the housing 4 in respect of any oscillations. The isolating element 10 is supported on the housing side on an annular housing section 12, which radially outside encloses a part of the isolating element 10 facing the housing 4.

Arranged on the side of the diaphragm base 8 facing the housing 4 is a piezo element 14, which can be supplied with voltage via an electrical contact 16. Under the piezo effect this contracts and expands and sets the diaphragm base 8 in oscillation, so that ultrasonic signals are generated.

The diaphragm 6 represented in FIG. 2 has a substantially cylindrical wall section 18 adjoining the diaphragm base 8. The central axis of the cylindrical wall section 18 corresponds to an axial direction of the ultrasonic sensor 2, which in FIG. 2 is denoted by the reference numeral 20.

The diaphragm 6 according to FIG. 2 has an annular, substantially cylindrical auxiliary element 22, which is arranged radially outside the wall section 18. The auxiliary element 22 has an annular end face 26, which can also be seen in FIG. 1. The auxiliary element 22 extends in an axial direction 20 from the diaphragm base 8 towards an end of the diaphragm 6 denoted by 24. The auxiliary element 22 is supported adjacent to this end 24 on a step 28 in the wall section 18 facing radially outwards.

The diaphragm 6 according to FIG. 2 furthermore comprises an auxiliary element 30, which is arranged radially inside the wall section 18 and in an axial direction 20 is arranged adjacent to the end 24 of the diaphragm 6.

The diaphragm base 8 and the wall section 18 and the step 28 of the diaphragm 6 are formed from aluminium or an aluminium alloy. The auxiliary element 22 and the auxiliary element 30 are formed from steel or a steel alloy and are each connected by a press fit to the wall section 18 of the diaphragm 6. The auxiliary elements 22 and 30 are of rectangular cross section.

The diaphragm 6' represented in FIG. 3 is of similar construction to the diaphragm 6 described with reference to FIG. 2. For this reason it is proposed to examine only the differences between the diaphragm 6 and the diaphragm 6'. Adjacent to its end 24 the diaphragm 6' has an auxiliary element 32 arranged radially inside the wall section 18. This element is pressed into an annular shoulder-shaped seat 34 of complementary design, which is formed at the end 24 of the diaphragm 6'.

The invention claimed is:

1. A motor vehicle ultrasonic sensor comprising:
   a housing; and
   a diaphragm, which is supported in or on a section of the housing and which comprises a diaphragm base and a cylindrical wall section adjoining the diaphragm base,
   wherein at least one stabilizing and attenuating auxiliary element are arranged on or in the wall section of the diaphragm,
   wherein the auxiliary element and the diaphragm base are formed from different materials, and
   wherein the diaphragm base is formed from a material which has a lower resistance to deformation than the material that forms the auxiliary element.

2. The ultrasonic sensor according to claim 1, wherein the diaphragm base is formed at least partially from aluminium.

3. The ultrasonic sensor according to claim 1, wherein the auxiliary element is formed at least partially from steel.

4. The ultrasonic sensor according to claim 1, wherein the auxiliary element is formed at least partially from a ceramic material.

5. The ultrasonic sensor according to claim 1, wherein the auxiliary element is formed at least partially from plastics.

6. The ultrasonic sensor according to claim 1, wherein the auxiliary element is of annular design shape.

7. The ultrasonic sensor according to claim 1, wherein the auxiliary element is of circular cross section.

8. The ultrasonic sensor according to claim 1, wherein the auxiliary element is of rectangular cross section.

9. The ultrasonic sensor according to claim 1, wherein the auxiliary element is formed by a retainer ring.

10. The ultrasonic sensor according to claim 9, wherein the retainer ring is supported in a groove formed on the wall section.

11. The ultrasonic sensor according to claim 1, wherein the auxiliary element is arranged radially inside the wall section.

12. The ultrasonic sensor according to claim 1, wherein the auxiliary element is arranged radially outside the wall section.

13. The ultrasonic sensor according to claim 1, wherein the auxiliary element and the wall section are pressed together.

14. The ultrasonic sensor according to claim 1, wherein the auxiliary element extends in an axial direction of the wall section from an end of the diaphragm remote from the diaphragm base towards the diaphragm base.

15. The ultrasonic sensor according to claim 1, wherein the auxiliary element extends in an axial direction of the wall section from the diaphragm base towards the end of the diaphragm remote from the diaphragm base.

16. The ultrasonic sensor according to claim 15, wherein the auxiliary element extends right up to the end of the diaphragm.

17. The ultrasonic sensor according to claim 1, wherein the auxiliary element forms the wall section.

* * * * *